US006243789B1

(12) United States Patent
Hasbun et al.

(10) Patent No.: US 6,243,789 B1
(45) Date of Patent: *Jun. 5, 2001

(54) METHOD AND APPARATUS FOR EXECUTING A PROGRAM STORED IN NONVOLATILE MEMORY

(75) Inventors: Robert N. Hasbun, Shingle Springs; David A. Edwards, Orangevale, both of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/028,159

(22) Filed: Feb. 23, 1998

Related U.S. Application Data

(63) Continuation-in-part of application No. 08/578,474, filed on Dec. 26, 1995, now Pat. No. 5,829,013.

(51) Int. Cl.$^7$ .................................................. G06F 12/08
(52) U.S. Cl. .................. 711/103; 711/102; 711/104; 711/165; 711/202
(58) Field of Search .................................. 711/103, 102, 711/165, 104, 202

(56) References Cited

U.S. PATENT DOCUMENTS

| 4,758,944 | 7/1988 | Bartley et al. ................. 711/171 |
| 4,849,878 | 7/1989 | Roy ................................. 707/200 |

(List continued on next page.)

OTHER PUBLICATIONS

"A TrueFFS and FLite Technical Overview of M–Systems' Flash File Systems", M–Systems Technology Brief, Oct. 1996, (pp. 1–10).

Products Guide, M–Systems (reprinted Apr. 1997), (3 pgs.).

News & Events: Products, Partners and Corporate Press Release Index, M–Systems, (reprinted Apr. 11, 1997), (1 page).

"Intel and M–Systems Sign FTL Marketing Agreement", News and Events Press Releases, M–Systems, Dec. 11, 1995 (2 pgs.).

(List continued on next page.)

*Primary Examiner*—Reginald G. Bragdon
(74) *Attorney, Agent, or Firm*—Blakely, Sokoloff, Taylor & Zafman LLP

(57) ABSTRACT

A method of executing a program includes the step of initiating execution of the program stored contiguously without code fragmentation in a nonvolatile memory. Execution of the program is halted if the program attempts to modify a page of the nonvolatile memory. The page of nonvolatile memory is then copied to a modifiable memory. The page of nonvolatile memory is then remapped to the modifiable memory. Execution of the program is then resumed. A computer system for execution of a program includes a nonvolatile memory storing a program contiguously without code fragmentation. The computer system includes a processor for executing the program. A memory management unit generates an interrupt in response to a request to modify a page of the nonvolatile memory. Execution of the program is halted and the processor copies the page of nonvolatile memory to a modifiable memory in response to the interrupt. The processor resumes execution of the program after updating an address translation table of the memory management unit to refer to the modifiable memory for subsequent program access requests to the page of nonvolatile memory.

13 Claims, 8 Drawing Sheets

U.S. PATENT DOCUMENTS

| | | | |
|---|---|---|---|
| 5,297,148 | 3/1994 | Harari et al. | 714/710 |
| 5,333,292 | 7/1994 | Takemoto et al. | 711/103 |
| 5,361,343 | 11/1994 | Kosnocky et al. | 365/185.11 |
| 5,404,485 | 4/1995 | Ban | 711/202 |
| 5,410,707 | 4/1995 | Bell | 713/2 |
| 5,437,020 | 7/1995 | Wells et al. | 714/6 |
| 5,479,639 | 12/1995 | Ewertz et al. | 711/103 |
| 5,519,831 | 5/1996 | Holzhammer | 714/22 |
| 5,519,843 | 5/1996 | Moran et al. | 711/103 |
| 5,522,076 | 5/1996 | Dewa et al. | 713/2 |
| 5,530,673 | 6/1996 | Tobita et al. | 365/185.09 |
| 5,533,190 | 7/1996 | Binford | 714/6 |
| 5,535,357 | 7/1996 | Moran et al. | 711/103 |
| 5,535,369 | 7/1996 | Wells et al. | 711/171 |
| 5,544,356 | 8/1996 | Robinson et al. | 707/205 |
| 5,563,828 | 10/1996 | Hasbun et al. | 365/185.33 |
| 5,579,522 | 11/1996 | Christeson et al. | 713/2 |
| 5,581,723 | 12/1996 | Hasbun et al. | 711/103 |
| 5,592,669 * | 1/1997 | Robinson et al. | 707/206 |
| 5,596,738 | 1/1997 | Pope | 711/103 |
| 5,602,987 | 2/1997 | Harari et al. | 714/8 |
| 5,603,056 | 2/1997 | Totani | 710/8 |
| 5,671,388 | 9/1997 | Hasbun | 711/103 |
| 5,680,570 | 10/1997 | Rantala et al. | 711/113 |
| 5,701,492 | 12/1997 | Wadsworth et al. | 717/11 |
| 5,715,423 | 2/1998 | Levy | 365/185.11 |
| 5,717,886 | 2/1998 | Miyauchi | 711/103 |
| 5,737,742 | 4/1998 | Achiwa et al. | 711/103 |
| 5,829,013 * | 10/1998 | Hasbun | 711/103 |
| 5,937,434 * | 8/1999 | Hasbun et al. | 711/173 |

OTHER PUBLICATIONS

"AMD Flash Card Products Supported by TrueFFS Software", News and Events Press Releases, M–Systems, Mar. 24, 1997 (2 pgs.).

"M–Systems Announces a NOR Flash Disk Solution Suite", News and Events Press Releases, M–Systems, Aug. 19, 1996 (3 pgs.).

"Offering up to 72 Mbytes in a single–chip 32–pin DIP, Flash DiskOnChip 2000 showcases striking improvements in capacity, performance and price", News and Events Press Releases, M–Systems, Embedded Systems Conference, Mar. 17, 1997 (3 pgs.).

"Flash PC Card Performance and Capacity Boosted with the Series 2000 NAND–based Architecture", News and Events Press Releases, M–Systems, Jan. 27, 1997 (2 pgs.).

"FTL, Flash Translation Layer", M–Systems, (reprinted Apr. 11, 1997), (2 pgs.).

"M–Systems Introduces Industry's Fastest SCSI Flash Disk", News and Events Press Releases, M–Systems, Mar. 14, 1996 (2 pgs.).

"FlashDisk alternatives, ATA Versus FTL", M–Systems, May 1996 (8 pgs.).

Maurice J. Bach, "The Design of the Unix Operating System", Prentice–Hall, Inc., 1986, pp. 285–305.

* cited by examiner

METHOD AND APPARATUS FOR EXECUTING A PROGRAM STORED IN NONVOLATILE MEMORY

This application is a continuation-in-part of Ser. No. 08/578,474 filed Dec. 26, 1995 now U.S. Pat. No. 5,829,013 issued to Hasbun.

FIELD OF THE INVENTION

This invention relates to the field of computer systems. In particular, this invention is drawn to execution of a program stored in a nonvolatile memory.

BACKGROUND OF THE INVENTION

Program storage requirements can be divided into at least two categories: a data section and a code section. At least some portion of the data section is typically allocated to a modifiable memory such as volatile random access memory (RAM) to permit manipulation and modification of data during program execution.

In order to execute a program, the program is typically retrieved from a nonvolatile mass storage device such as an electromechanical disk drive or a compact disk (CD) drive and assembled into an executable image in the volatile memory. Thus the code section may also reside within the volatile memory.

One disadvantage of this technique of program storage is the time consumed when loading the program from the nonvolatile memory and constructing the executable image in the volatile memory. Another disadvantage is that this loading process must be performed each time power is re-applied to the computer system given that the volatile memory retains its contents only while power is applied.

In order to avoid some of the disadvantages, a program can be placed into a nonvolatile memory as an executable image and executed directly from a nonvolatile memory. Nonvolatile memory offers the ability to preserve the contents of the memory after power is removed. Unfortunately, many nonvolatile memories are not as readily modifiable as their volatile counterparts. For example, a nonvolatile memory may not be modifiable at all (i.e., read only memory, ROM). Alternatively, the nonvolatile memory may have certain characteristics (e.g., erasable only in blocks) that require substantially more overhead to manage modification than that required by modifiable volatile memories.

Although the program typically informs the operating system of its modifiable memory requirements for data storage, the program may unexpectedly attempt to modify areas, such as code storage areas, that are otherwise presumed by the operating system to not be modified by the executing program. As long as the data and code are stored in modifiable volatile memory, such unexpected modifications do not typically prevent the program from successfully executing. The program may not successfully execute, however, if modification of information stored in nonvolatile memory is required due to the limitations of the nonvolatile memory. Thus a program designed to execute in a modifiable memory may have to be rewritten to permit execution in a nonvolatile memory.

SUMMARY OF THE INVENTION

A method of executing a program stored contiguously without code fragmentation within a nonvolatile memory includes the step of initiating execution of the program. Execution of the program is halted if the program attempts to modify a page of nonvolatile memory. The page of nonvolatile memory is copied to a modifiable memory. The page of nonvolatile memory is remapped to the modifiable memory. Execution of the program is then resumed.

A computer system for execution of a program includes a nonvolatile memory storing a program contiguously without code fragmentation. The computer system includes a processor for executing the program. A memory management unit generates an interrupt in response to a program request to modify a page of the nonvolatile memory. Execution of the program is halted and the processor copies the page of nonvolatile memory to a modifiable memory in response to the interrupt. The processor resumes execution of the program after updating an address translation table of the memory management unit to refer to the modifiable memory for subsequent program access requests to the page of nonvolatile memory.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
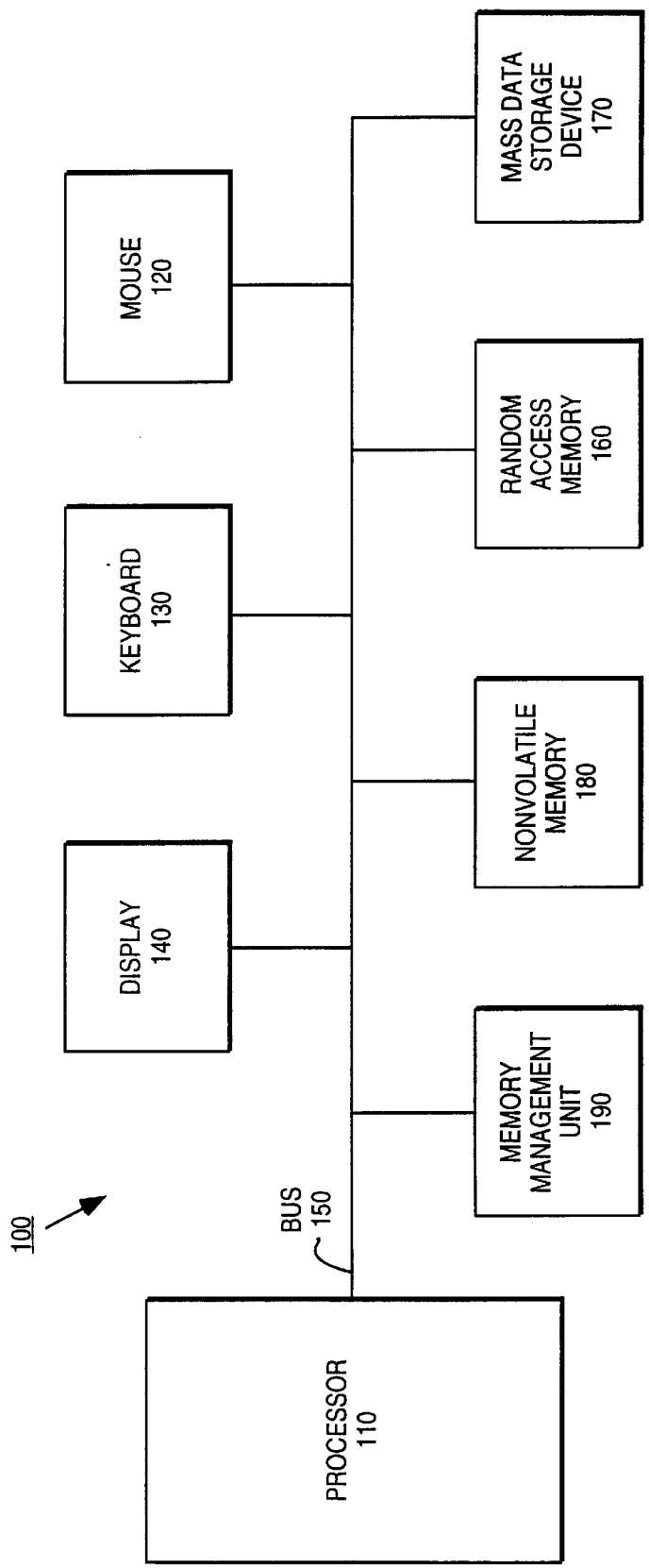
FIG. 1 illustrates one embodiment of a computer system.

FIG. 1 illustrates one embodiment of a computer system architecture. The computer system 100 includes processor 110. Input devices such as mouse 120 and keyboard 130 permit the user to input data to computer system 100. Information generated by the processor is provided to an output device such as display 140. Computer system 100 generally includes modifiable memory such as random access memory (RAM) 160 which is used by the processor during program execution. Modifiable memory such as RAM 160 is typically a volatile memory and cannot retain its contents once power is removed.

Memory management unit (MMU) 190 provides address translation and protection functions for accessing information stored in RAM 160. Typically, the MMU is designed to provide address translation and protection functions on allocation units referred to as pages. The logical-to-physical address translations for pages of memory as well as the protection levels for these pages are typically maintained in MMU address translation tables.

Nonvolatile memory 180 typically contains bootstrap code required to boot the computer system and its operating system. In one embodiment, nonvolatile memory 180 stores a Basic Input/Output System (BIOS).

Often parameter information which identifies specific features of the input/output devices is also stored in a nonvolatile memory. In one embodiment, the parameter information is stored in battery-backed complementary metal oxide semiconductor (CMOS) based memory. For example, parameter information might describe the number of disk drives, disk drive type, number of heads, tracks, amount of system RAM, etc.

ROMs, programmable read only memory (PROM), and electrically programmable read only memories (EPROMs) represent various types of nonvolatile memories. Another type of nonvolatile memory is flash electrically erasable programmable read only memory. Unlike the battery-backed CMOS memory used for parameter information storage, flash memories retain their contents without the need for continuous power.

One type of flash EEPROM memory cell is a single transistor memory cell sometimes referred to as electrically rewritable memory in order to distinguish it from two transistor EEPROM cells. The embodiments described below are in reference to the single transistor type of flash EEPROM.

Flash memory cells cannot be rewritten with new data without first erasing them, with the exception that any flash memory cell storing a "1" can always be programmed to a "0". Generally, flash memory cells are not individually erasable. Flash memories are typically subdivided into one or more individually erasable blocks. An entire block must be erased in order to erase any cell within the block. Erasure of a block of flash memory sets all the cells within the block to a pre-determined value. By convention, an erased flash cell is considered to be storing a value of "1".

Nonvolatile mass data storage device 170 is used to retain programs and data even when the computer system is powered down. In one embodiment nonvolatile mass storage device 170 is an electromechanical disk drive. In another embodiment nonvolatile mass storage device 170 is a solid state "disk" drive. Mouse 120, keyboard 130, RAM 160, nonvolatile memory 180, and nonvolatile mass storage device 170 are typically communicatively coupled to processor 110 through one or more address and data busses such as bus 150.

Computer system 100 uses a file system to manage long term storage of programs and data files in nonvolatile mass storage device 170. These programs and data files are stored in a format designed to facilitate management within the file system rather than execution on the processor.

For example, the file system typically divides a file into smaller allocation units (e.g., sectors) and then stores the individual fragments within mass storage device 170. The file system maintains a map of these allocation units so that the file can be reassembled when requested. In order to execute a program stored within mass storage device 170, the operating system retrieves the program from mass storage device 170 using the file system. The operating system then creates an executable image of the portion of the program being executed in volatile memory 160.

In order to avoid the time for loading and at least some of the storage redundancy, the executable image can be stored in nonvolatile memory such as nonvolatile memory 180. Volatile memory is often easy to modify. A number of nonvolatile memories, however, are not as easy to modify.

For example, a read only memory (ROM) might not be modifiable at all. Erasure of a nonvolatile memory such as flash electrically erasable programmable read only memory (flash EEPROM) may be relatively time consuming. Moreover, additional memory management may be required for block erasable nonvolatile memory.

For program execution two types of storage are needed. One type of storage is data storage. The data storage typically needs to be modifiable so that the program has a working space of modifiable memory. The data storage area is operated upon by executing program instructions. One type of storage is for the program code itself and may be referred to as code storage.

Ideally, the code storage area of a program should not be modified by the program. Unfortunately, not all programs adhere to this practice. Code designed for a volatile memory may not readily be ported to a nonvolatile memory if the program modifies its own code storage areas.

If program code is stored within modifiable memory, then modification of the code storage area is possible. If the program code is stored within nonvolatile memory, however, modification of the code storage area may not be possible because modification of the memory is impossible or requires additional overhead. Thus any program written to modify the code storage area may have to be rewritten in order to properly execute, if the program is stored in a nonvolatile memory.

If the code is stored as pages in the nonvolatile memory, however, the memory management unit can be used in conjunction with modifiable memory to support execution of a program stored in nonvolatile memory that cannot otherwise be executed within the nonvolatile memory. Moreover, if the code pages are contiguous and there is no extraneous data (page headers, etc.) fragmenting the continuity of the code, then address fixups to map around the extraneous data will not be necessary.

Figure 2:
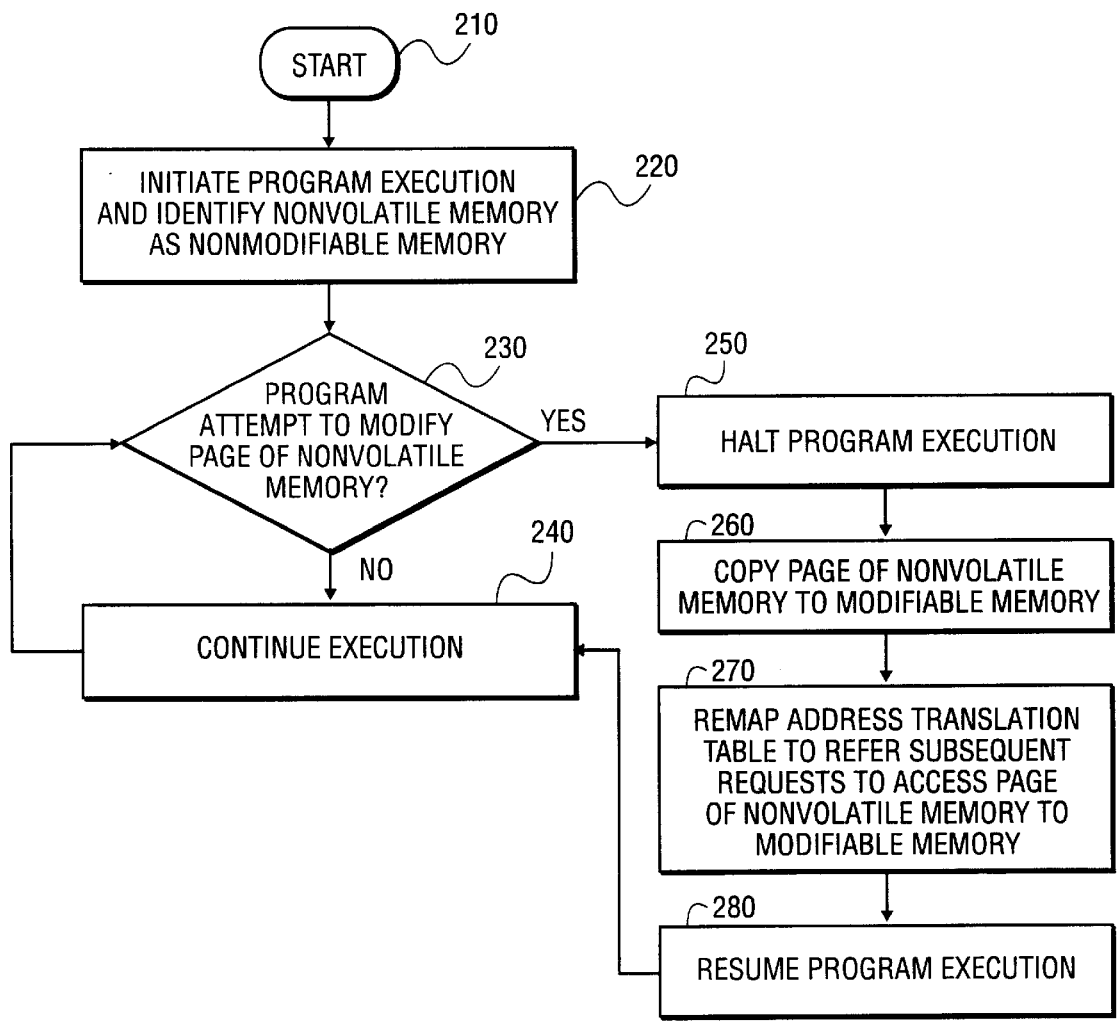
FIG. 2 illustrates one embodiment of a method of executing code stored within a nonvolatile memory.

FIG. 2 illustrates one technique that supports execution of a program that may modify its own code storage area beginning with step 210.

In step 220, the nonvolatile memory is designated or identified as nonmodifiable so that any attempt to modify or write to the memory can be detected. In step 220, execution of the program is initiated. During execution of the program, if the program attempts to modify a page of the nonvolatile memory, step 230, execution is interrupted, step 250, and the page of nonvolatile memory is copied to a modifiable memory in step 260. The page is identified as being modifiable, step 270. Execution of the program may then resume, step 280. The process of detecting an attempt to modify a page of nonvolatile memory, copying that page to modifiable memory, and then resuming execution can be performed repeatedly during execution of the program.

Thus a method of executing a program includes the step of initiating execution of the program. If execution of a program instruction would modify a page of the nonvolatile memory, then 1) program execution is halted; 2) the page of nonvolatile memory is copied to a modifiable memory; 3) the page of nonvolatile memory is remapped to the modifiable memory; and 4) program execution can resume.

This method is particularly suited to handheld computing devices such as "handheld personal computers" or HP/Cs. HP/Cs such as the Velo® manufactured by Philips Electronics, Inc., PC Companion® manufactured by Compaq Computer Corporation, the NEC MobilPro®, and the Sharp Mobilon™ have incorporated "rommed" versions of an operating system previously designed to work in a modifiable, volatile memory such as dynamic random access memory (DRAM).

The use of a popular operating system such as Microsoft Disk Operating System (MS-DOS)™ or Microsoft Windows (MS-Windows)™ enables the handheld device to utilize a large volume of software already developed for these operating systems. As a result rommed versions of these operating systems were developed. For example, Microsoft Windows CE™ is a rommed member of the Microsoft Windows family of operating systems.

Committing resources to develop a "rommable" version of the operating system can be very expensive. Moreover, altering the original program code in an attempt to eliminate self-modifying code risks incurring compatibility issues with software written for the non-rommable version of the operating system. The method presented above allows nonvolatile memory storage and execution of program code regardless of whether the program code improperly attempts to modify the code storage areas.

Depending upon how the program is stored within the nonvolatile memory, memory management unit (MMU) 190 can be used to implement the described method. Moreover, address "fixups" required to get around non-code portions of the pages might be avoided if the program is stored properly within the nonvolatile memory as described below.

Figure 3:
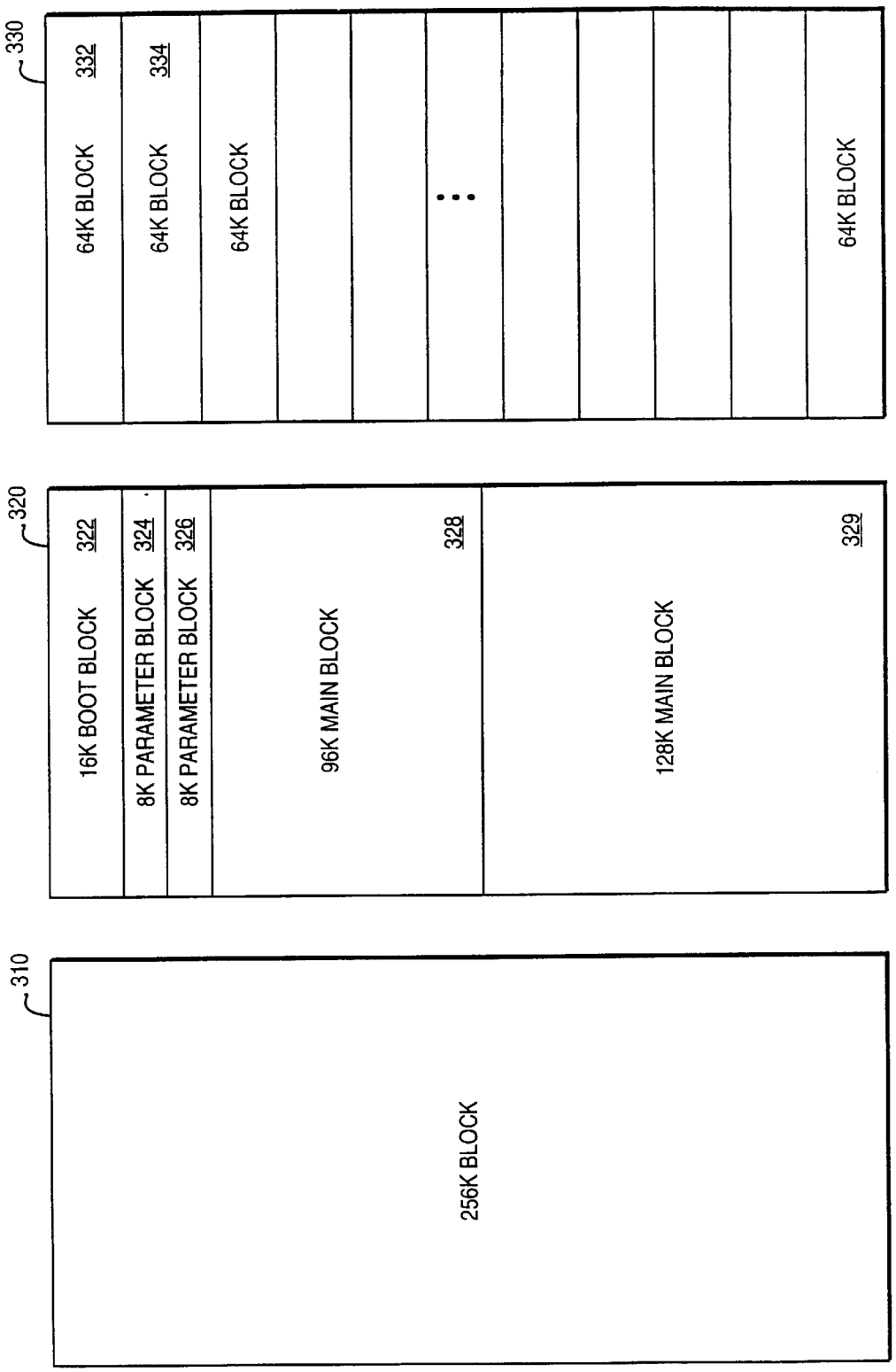
FIG. 3 illustrates various nonvolatile memory blocking structures.

FIG. 3 illustrates a number of nonvolatile memory architectures. Nonvolatile memory such as flash memory is typically block erasable. Thus in order to erase one memory cell, every cell in the block must be erased.

Nonvolatile memories have been designed with a variety of block architectures. Nonvolatile memory 310 is erasable only in bulk. The 10 entire memory is one block. Thus in order to erase one memory cell, the entire nonvolatile memory 310 must be erased. Nonvolatile memory 330 is symmetrically blocked. Each block is the same size.

Nonvolatile memory 320 is asymmetrically blocked to permit independent updating of different types of information. For example, updating parameter data or BIOS code can be independent operations if parameter data and BIOS are segregated into individually erasable blocks. In one embodiment, bootstrap routines are stored in boot block 322. Parameter data is stored in blocks 324 and 326 and BIOS is stored in blocks 328 and 329. Thus the bootstrap routines, parameter data, and BIOS are treated as objects which can be independently modified by placing them in physically distinct blocks. Segregating the types of information into different blocks permits updates by the type of information. For example, placing the bootstrap code and the BIOS in separate blocks permits updating the BIOS without erasing the bootstrap code. Similarly, placing parameter data and the BIOS in separate blocks permits independent modification of BIOS and parameter data. Thus some nonvolatile memories are asymmetrically blocked to accommodate the varying storage requirements of different types of information in order to facilitate updates by type of information. Given that the storage requirements of different types of information vary, the nonvolatile memory is asymmetrically blocked for more efficient memory allocation.

The variety of blocking architectures and the peculiarities of flash memory including block erasability and one-way writability without erasure generally ensure that additional memory management overhead is required. If the code is organized as pages within the nonvolatile memory, however, MMU 190 can be used to permit execution of a program stored within the nonvolatile memory that is otherwise not executable.

Figure 4A:
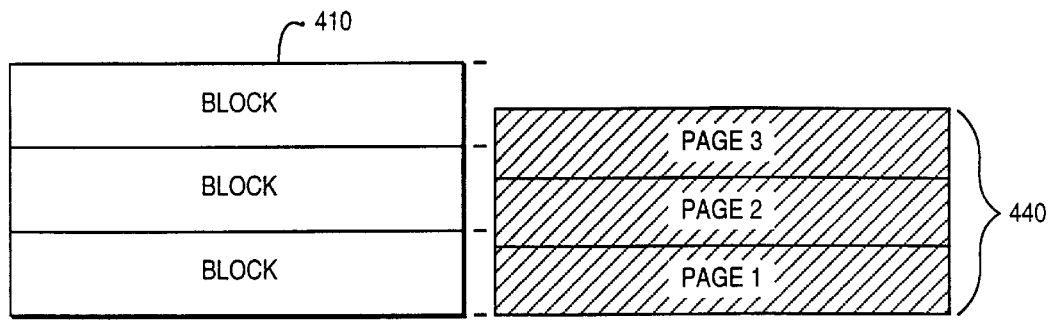
FIGS. 4a illustrates a page storage scheme wherein the page size is less than the block size of a symmetrically blocked nonvolatile memory.
Figure 4B:
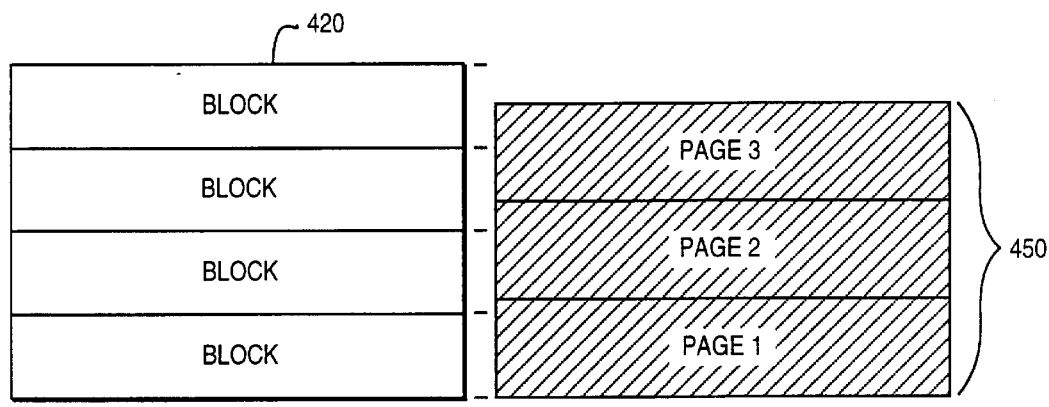
FIG. 4b illustrates a page storage scheme wherein the page size is larger than the block size of a symmetrically blocked nonvolatile memory.
Figure 4C:
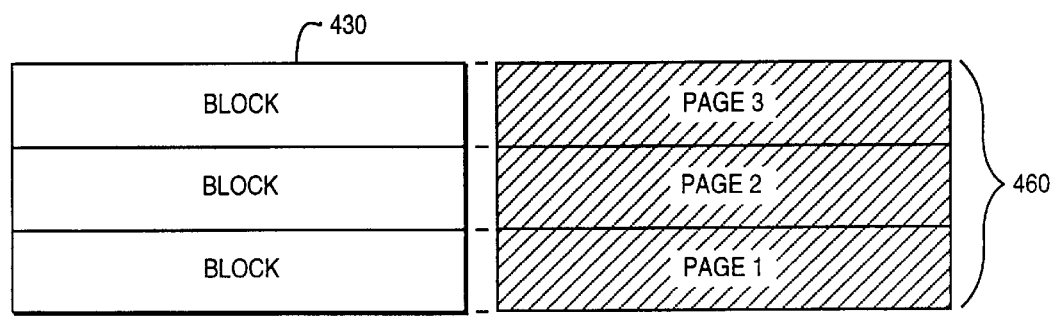
FIG. 4c illustrates a page storage scheme wherein the page size is the same as the block size of a symmetrically blocked nonvolatile memory.

Although the nonvolatile memory may be physically erasable only in blocks, the information stored within the nonvolatile memory may be accessed in allocation units of a page. Page size and block size are independent quantities. FIGS. 4a, 4b, and 4c illustrates a variety of page sizes for a symmetrically blocked nonvolatile memory.

In FIG. 4a, program code 440 includes three pages. Nonvolatile memory 410 includes three symmetrical blocks. In this embodiment, a page is smaller than a block. In one embodiment, the page size is selected so that a block can store an integer number of pages (i.e., block size modulo page size is zero).

In FIG. 4b, the three pages of program code 450 are stored in nonvolatile memory 420. In this embodiment, a page is larger than a block. In one embodiment, the page size is selected so that a page is an integer number of blocks (i.e., page size modulo block size is zero)

In FIG. 4c, program code 460 is stored in nonvolatile memory 430. In this embodiment, a page is the same size as a block.

Figure 5A:
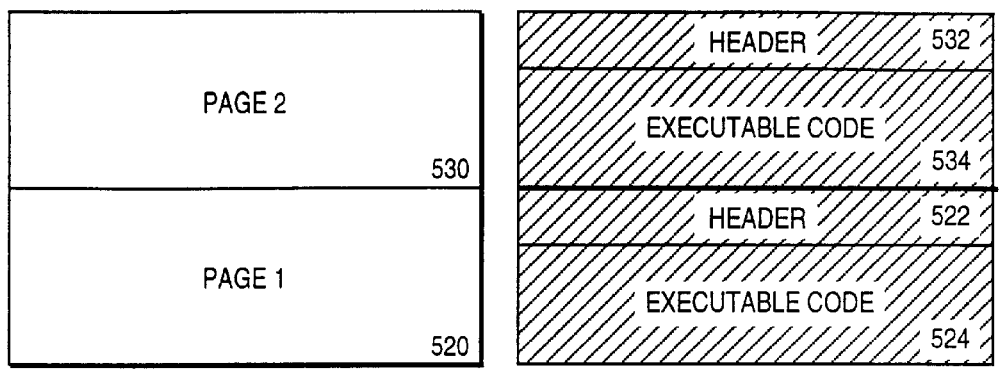
FIG. 5a illustrates a code storage scheme wherein each page of hi code contains non-code information so that the executable code is not contiguously stored within the nonvolatile memory.
Figure 5B:
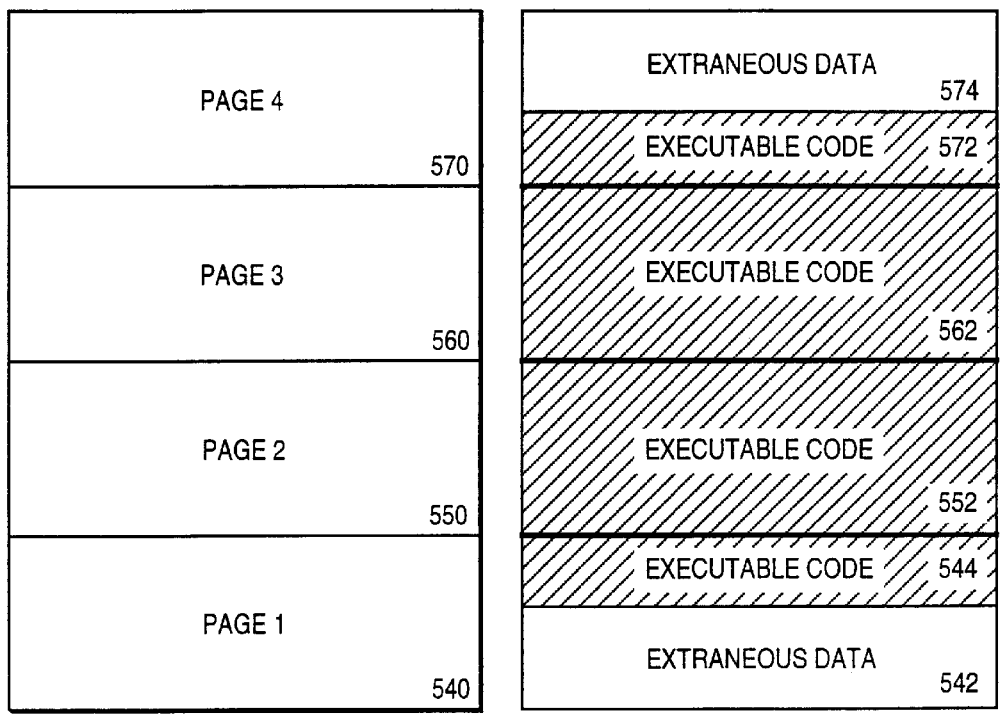
FIG. 5b illustrates one embodiment of a code storage scheme wherein the code is stored contiguously within the nonvolatile memory.

FIGS. 5a and 5b illustrate various method of storing code within a page. With respect to FIG. 5a, when the code does not fit within a single page, the code is allocated into multiple pages for storage. In this example, each page includes a header. Thus page 520 includes header 522 and executable code 524. Similarly, page 530 include header 532 and executable code 534. This arrangement can be found for example with file systems for nonvolatile memory. The header is used by the file system to identify the code for subsequently reassembling the code into a contiguous entity. Even if the pages containing the code are stored contiguously, however, the code cannot be directly executed without address fixups to map around the headers to the actual code portion of the page. The code is fragmented by extraneous information (i.e., headers). The code as stored does not form an executable image. Although header 532 is contiguous to 534, header 532 is not executable code. Address fixups are required to jump over the header 532 in order to continue execution with executable code 534.

FIG. 5b illustrates storing the code contiguously within the pages of nonvolatile memory so that the code is not fragmented by extraneous data such as headers, etc. Storing the code within pages of nonvolatile memory so that the pages are contiguous and the code is not fragmented is required if address fixups are to be avoided. Thus for example the executable code segments 544, 552, 562, and 572 are stored within contiguous pages 540, 550, 560 and 570 so that the code is not fragmented by extraneous data such as 542 and 574.

In one embodiment, the page can be used to store information other than code as long as the code remains unfragmented. Thus for example, the first page 540 and last page 570 can contain extraneous data such as 542 and 574, respectively. Although executable code 544 shares the same page as extraneous data 542, executable code segments 544, 552, 562, and 572 are still contiguous. Thus only the first and last pages can contain extraneous data.

In an alternative embodiment, the executable code is page-aligned and the page is not shared with other extraneous data. Thus although the code may not require an entire page for storage, the page will not be used to store other information in addition to the executable code.

At least one storage scheme permits storing pages and their associated headers such that the program code can be stored as contiguous pages without being fragmented by the headers. Such a storage scheme is used by a flash memory manager (FMM) described by Hasbun, et al. in U.S. Pat. No. 5,937,434 entitled Method of Managing a Symmetrically Blocked Nonvolatile Memory Having a Bifurcated Storage Architecture, and U.S. patent application No. 08/834,930 filed Apr. 6, 1997 entitled Method of Performing Reliable Updates in a Symmetrically Blocked Nonvolatile Memory Having a Bifurcated Storage Architecture.

The FMM treats items to be stored as objects. The FMM "virtualizes" physical block boundaries so that each stored object is treated as if it resides in its own block. For applications external to the FMM, this permits handling the stored objects without regard to the physical blocks they reside in or span. Instead of placing functionally distinct routines and data in separate physical blocks to ensure independent modification, the FMM provides a means of managing objects independently of physical block boundaries.

Figure 6:
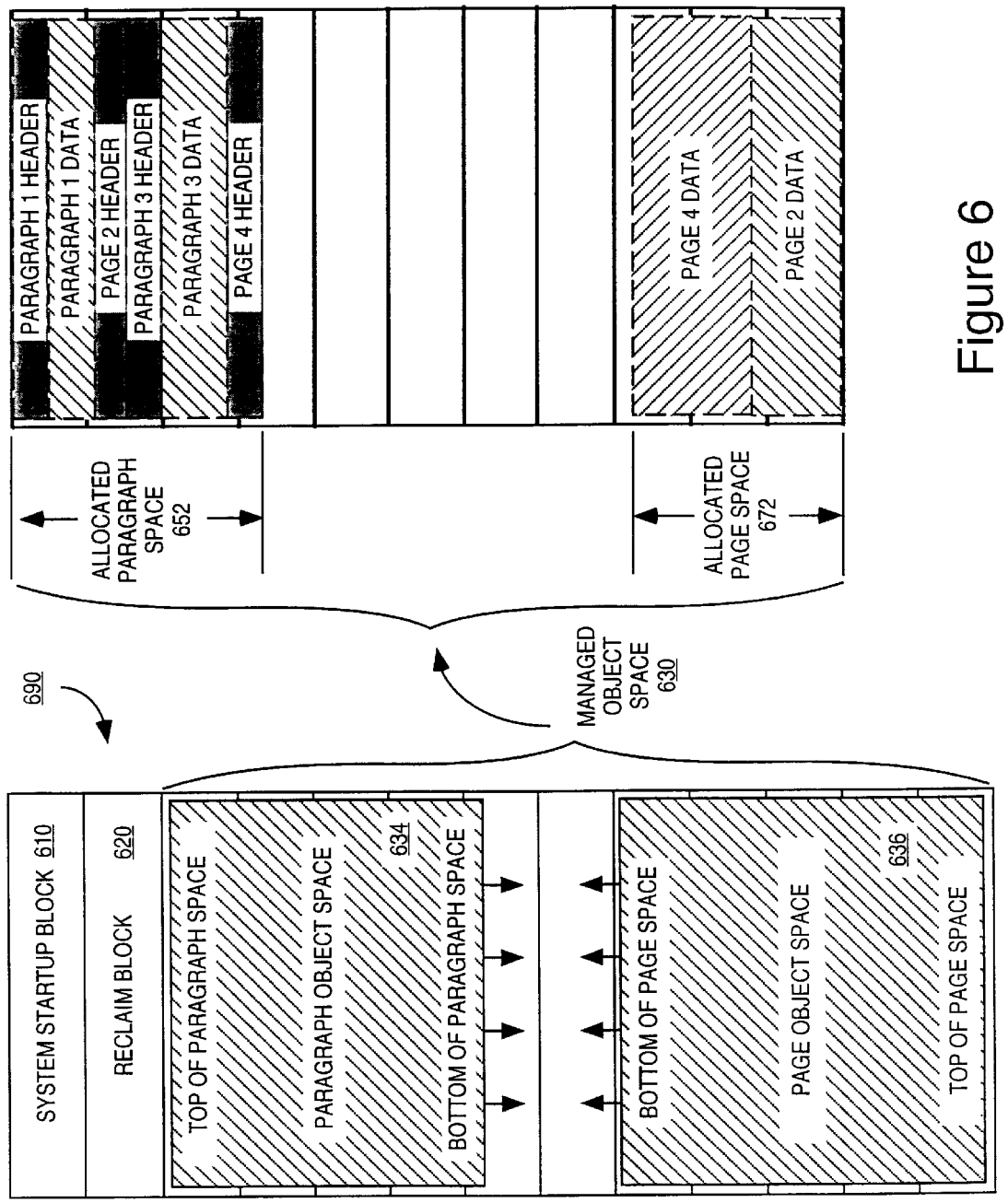
FIG. 6 illustrates a bifurcated storage scheme.

FIG. 6 illustrates one embodiment of the FMM architecture based on symmetrically blocked flash memory 690. The FMM architecture divides the nonvolatile memory into three dedicated areas. These areas include the system startup block 610 and reclaim block 620. The remaining area is referred to as the managed object space 630.

In one embodiment, system startup block 610 contains the necessary minimal amount of code or data required to initialize the computer system. Thus system startup block 610 might store the system initialization code such as a bootstrap loader. In one embodiment, the FMM code is also stored in system startup block 610. Any other code or data required for booting an operating system or defining system parameters may be stored as an object within the managed object space 630. For example, BIOS may be treated as an object and stored within managed object space 630.

Reclaim block 620 is used during the process of reclaiming memory allocated to objects that are no longer valid. In the embodiment illustrated, reclaim block 620 is located immediately after the startup block. In an alternative embodiment, reclaim block 620 is located in another dedicated location within the flash memory. Although only one block is illustrated for reclaim, other embodiments might use a plurality of reclaim blocks or other form of temporary storage.

The FMM stores objects within managed object space 630. FMM provides for two classes of objects: paragraph objects and page objects. Each class has its own allocation granularity, thus the FMM provides multiple allocation granularities for storing objects. This helps to eliminate wasteful memory usage by permitting the size of the "virtual" blocks to be closely fitted to the size of the item being stored.

The managed object space is divided into regions to accommodate the distinct object classes. In particular, page space 636 stores page objects and paragraph space 634 stores paragraph objects. Thus managed object space 630 is a bifurcated managed object space. Object allocation, writing, reading, de-allocation, reallocation, and reclamation functions vary depending upon whether the functions are performed for paragraph objects or page objects.

The top of managed object space 630 starts immediately after reclaim block 620. The top of allocated paragraph space 634 coincides with the top of managed object space 630. The top of allocated page space 636, however, coincides with the bottom of managed object space 630. The bottoms or ends of allocated page space and allocated paragraph space grow towards each other as page or paragraph space is allocated.

Thus space for paragraph objects is contiguously allocated from the top of managed object space 630 and grow towards the bottom of managed object space 630. Paragraph objects are always aligned on a paragraph boundary. A paragraph object is allocated an integer number of paragraphs when stored. In one embodiment, a paragraph is 16 bytes, thus any paragraph object will use an integer number of 16 byte paragraphs.

Page objects are contiguously allocated from the bottom of the managed object space 630 and grow towards the top of managed object space 630. Page objects are always aligned on a page boundary. A page object is allocated an integer number of pages when stored. In one embodiment, pages are 4 K in size, thus any page object will use an integer number of 4 K pages.

In order to perform object allocation, writing, reading, de-allocation, re-allocation, and reclamation within the managed object space, FMM uses a number of data structures. These data structures serve as tracking or auditing structures for managing the storage of the objects. In one embodiment, these data structures are stored within the managed object space. In an alternative embodiment, the data structures are not stored within the same managed object space as the objects they track.

One of the data structures used by FMM is a header. Every object within managed object space is identified by a header. A header provides information about the properties of its associated object space such as name, type, and size of the object. In one embodiment, the headers are stored in paragraph space 652, thus the headers themselves are also paragraph objects.

Headers may be further classified as paragraph headers and page headers. Paragraph headers identify another associated paragraph object. This other paragraph object may also be referred to as paragraph data. Thus paragraph headers and their associated paragraph data are stored within paragraph space. Page headers identify a page object. The page object may alternatively be referred to as page data. Page data is stored in page space. The page headers, however, are stored in paragraph space.

The location of objects within their respective spaces is determined by proximity. Objects are contiguously located in their respective object spaces such that no gaps exist between objects.

Paragraph data is located immediately after the paragraph header that identifies that paragraph object Given that the length of the header and the amount of memory allocated for the paragraph data are known, the location of the next header or other paragraph object can be determined.

The position of a page header relative to other page headers determines the location of page data in page space. For example, the location of page 4 within page space is determined by summing the page space used by all preceding page objects. This is accomplished by summing the size indicated by page headers preceding the page 4 header. In this example, the only preceding page header is the page 2 header. Given that page objects are allocated contiguously from the bottom of managed object space towards the top of managed object space, the size of the preceding page objects (page 2) indicates an offset from the top of page object space to the beginning of the desired page object (page 4).

The storage architecture of FIG. 6 permits storing a program as one or more pages within the nonvolatile memory 690. Moreover, the page data (i.e., program code) can be contiguously stored without fragmentation by headers. This permits contiguous storage of a program without code fragmentation.

Figure 7:
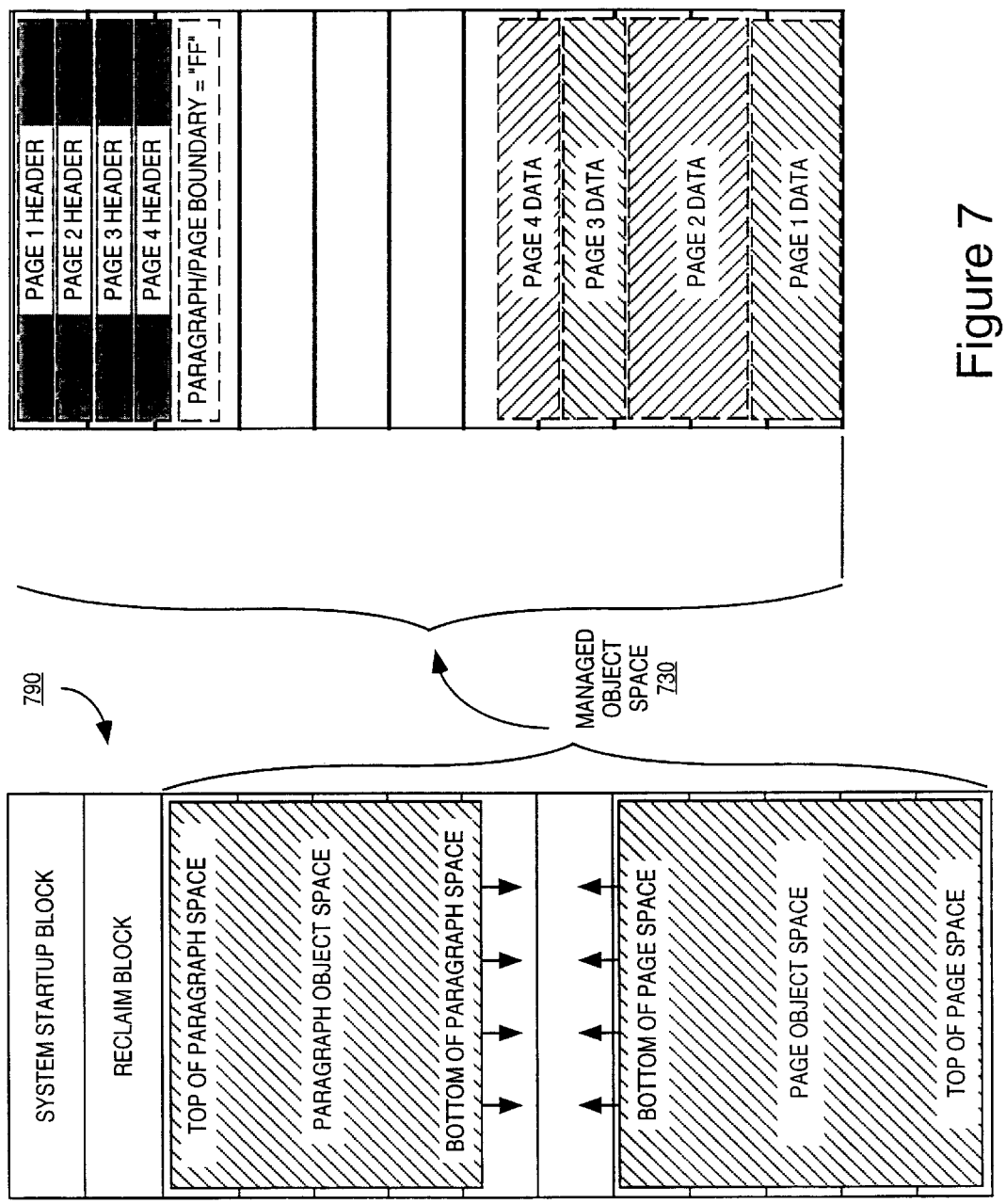
FIG. 7 illustrates the bifurcated storage scheme of FIG. 6 without paragraph data.

FIG. 7 illustrates the same architecture without paragraph data objects. Thus nonvolatile memory 790 is storing page data and corresponding headers within managed object space 730. As in FIG. 6, the page headers used to identify a specific page within managed object space 730 are not located within the page being identified. Thus the page data (e.g., program code) can be contiguously stored without fragmentation by headers. This permits contiguous storage of a program without code fragmentation.

Application of the method of FIG. 2 to program code stored within the nonvolatile memory using the bifurcated storage architecture of FIGS. 6 or 7 permits execution without address fixups. Thus a method of executing a program without address fixups includes the step of initiating execution of the program stored contiguously without code fragmentation within a nonvolatile memory. If execution of a program instruction would modify a page of the nonvolatile memory, then 1) program execution is halted; 2) the page of nonvolatile memory is copied to a modifiable memory; 3) the page of nonvolatile memory is remapped to the modifiable memory; and 4) program execution can resume.

One embodiment of the implementation of the method described in FIG. 2 utilizes MMU 190 for accessing the nonvolatile memory. MMU 190 can be used to determine if an attempt is made to modify the nonvolatile memory. MMU 190 provides a number of memory management features including access protection.

The address space of the MMU can be assigned various protection attributes. Thus the memory can be designated as Read Only (R), Write (W), Modify (M), Execute (E) or some logical combination of these attributes. If an instruction requests accessing the memory in violation of the protection attributes, the MMU provides an interrupt indicative of a memory access violation. In one embodiment, the MMU is used to implement the method described above.

Figure 8:
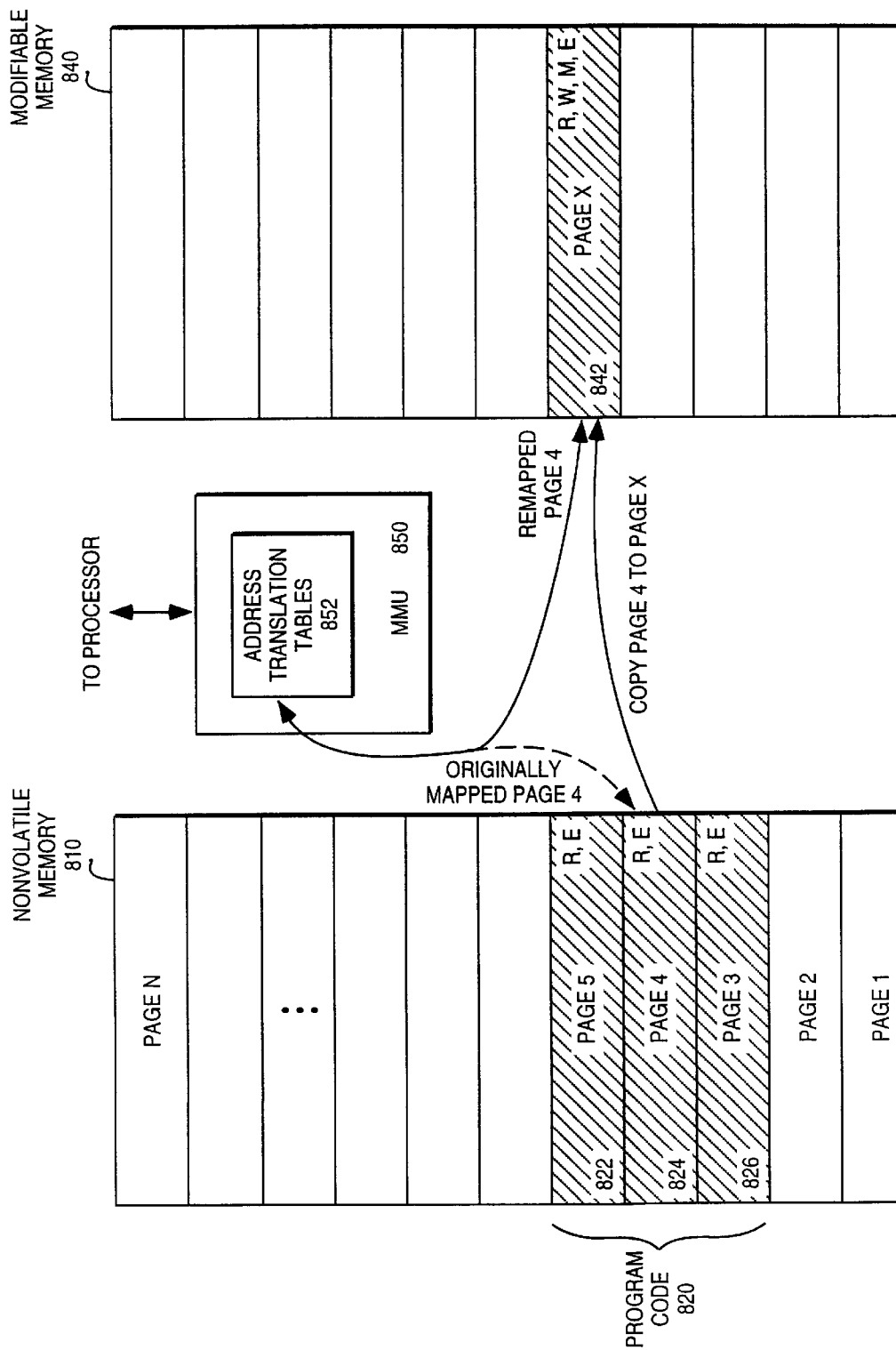
FIG. 8 illustrates copying of a selected page of code from a nonvolatile memory to a modifiable memory for execution in response to an interrupt generated by a memory management unit.

FIG. 8 illustrates using an MMU to support the method described above. At least a portion of nonvolatile memory 810 is organized as paged memory. For example, various embodiments can use the bifurcated storage architecture of FIGS. 6 and 7.

This paged nonvolatile memory can be used to store code (including that of the program being executed) or data or both. In the embodiment illustrated, program code 820 is stored in page 3 (826), page 4 (824), and page 5 (822) of nonvolatile memory 810. In the embodiment illustrated, the code is page-aligned and the pages are not shared with extraneous information.

In one embodiment, nonvolatile memory 810 comprises flash memory of the single transistor memory cell type. In alternative embodiments, the nonvolatile memory is EEPROM, EPROM, or ROM.

In one embodiment, the nonvolatile memory is symmetrically blocked. In alternative embodiments, the nonvolatile memory is asymmetrically blocked or comprises a single block.

In one embodiment, the page size is the same as the nonvolatile memory block size. In another embodiment, the page size is independent of the nonvolatile memory block size.

Nonvolatile memory 810 is identified as non-modifiable to MMU 850. This will cause MMU 850 to generate an interrupt if an attempt is made to modify the contents of nonvolatile memory 850. Reading and execution of the contents of nonvolatile memory are permitted (i.e., R, E), however, modification or writing (i.e., M, W) are not. Thus page 3 (826), page 4 (824), and page 5 (822) are designated R, E.

Typically an MMU does not distinguish between "modifiable" and "writable." This is because MMUs are used in conjunction with modifiable memories such as dynamic random access memories (DRAM) which are easily writable and modifiable. A DRAM can be programmed to any state regardless of the present state of the DRAM. Thus there is no distinction between "modifying" and "writing" such a volatile memory. Designating the address space of the DRAM as non-writable for a typical MMU protects the DRAM from modification or writing.

In contrast with a DRAM, a nonvolatile memory may not be writable or modifiable at all (e.g., a ROM). Alternatively, due to the characteristics of a nonvolatile memory such as flash memory (e.g., block erasable only, not re-writable unless erased), the nonvolatile memory may not be easily modified. For example, although a flash memory is writable, once programmed the flash memory is not modifiable without erasure. In order to accomplish modification, the nonvolatile memory may have to be erased and then written with the desired values. If the nonvolatile memory is only block erasable, a memory manager may be required to handle the process of erasing the block and restoring any other objects that were stored in the same block as the object being modified. Thus nonvolatile memories such as flash memory are not easily modified.

In the event that a distinction between "modifiable" and "writable" exists, the nonvolatile memory is identified to ensure that the MMU generates an interrupt in response to an attempt to modify or write to the nonvolatile memory. With reference to typical MMUs modification and writing are indistinguishable operations; therefore protecting the nonvolatile memory from write operations also protects the nonvolatile memory from modification. Thus in one embodiment the nonvolatile memory is designated as non-modifiable by designating its address space as non-writable to the MMU.

If the program being executed attempts to modify a location within page 4 (824), the MMU will generate an interrupt. Typically the offending instruction is treated as if it has not yet executed. Thus the program is halted at the offending instruction.

In response to the interrupt, page 4 of nonvolatile memory 810 is copied to a modifiable memory, such as page X 842 of modifiable memory 840. In the embodiment illustrated, page X is identified with attributes R, W, M, E to indicate that writing or modification is permitted. Thus the modifiable memory is designated as such to the MMU.

As stated above, a typical MMU does not distinguish between modifiable and writable, thus designating the modifiable memory as writable (i.e., "W") is equivalent to designating the modifiable memory as both writable and modifiable.

After copying page 4 (824) of nonvolatile memory 810 to page X (842) of modifiable memory 840, the address translation tables 852 of MMU 850 are updated to reflect that page 4 of the nonvolatile memory has been remapped to page X of the modifiable memory. Thus subsequent accesses to page 4 of the nonvolatile memory will be referred to page X of the modifiable memory.

In one embodiment, modifiable memory 840 is volatile memory such as DRAM. Modifiable memory 840, however, can be a nonvolatile memory if it can be readily modified. For example, in one embodiment modifiable memory 840 is battery-backed random access memory so that the random access memory retains its contents after the remainder of the computer system is turned off.

After updating the translation tables, program execution may resume and continue until the program is completed or another such interrupt occurs. As long as the code is stored contiguously (e.g., the pages do not contain header or other information to fragment the code), no address fixups will be required. The process of interrupting execution in response to an attempt to modify nonvolatile memory, copying the page of nonvolatile memory to modifiable memory, updating the MMU, and then resuming execution can continue until the program is completed.

Thus methods and apparatus to permit execution of a program stored in a nonvolatile memory have been described. The method and apparatus permit execution of the program even if it contains self-modifying code stored within a non-modifiable (or not easily modifiable) memory. Thus the method and apparatus permit execution of a program that otherwise could not be executed due to the nature of its storage medium. Storing the program code as contiguous pages without code fragmentation permits execution without address fixups otherwise necessary to map around non-executable code.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of executing a program, comprising:
   initiating execution of a program stored in a nonvolatile memory
   performing the following if the program attempts to modify a page of the nonvolatile memory:
   halting execution of the program;
   copying the page of nonvolatile memory to a modifiable memory;
   remapping the page of nonvolatile memory to the modifiable memory; and
   resuming execution of the program.

2. The method of claim 1 further comprising:
   identifying the nonvolatile memory as a nonmodifiable memory.

3. The method of claim 1 wherein the nonvolatile memory is a flash electrically erasable programmable read only memory.

4. The method of claim 1 wherein the nonvolatile memory is a read only memory.

5. The method of claim 1 wherein the modifiable memory is a volatile memory.

6. The method of claim 1 wherein the modifiable memory is a random access memory.

7. A method of executing a program, comprising:
   initiating execution of a program; wherein an executable code of the program is contiguously stored without being fragmented by non-executable portions of the program in a nonmodifiable memory having a bifurcated storage architecture, to permit program execution without address fix-ups;
   executing an instruction to modify a portion of the executable code of the program stored in the nonmodifiable memory;
   performing the following in response to the executed program instruction to modify the portion of the executable code of the program stored in a page of the nonmodifiable memory:
   halting execution of the program;
   copying the executable code portion stored in the page of nonmodifiable memory to a modifiable memory;
   remapping the address of the executable code portion stored in the page of nonmodifiable memory and copied to the modifiable memory;
   modifying the executable code portion stored in the modifiable memory; and
   resuming execution of the program.

8. The method of claim 1 further comprising:
   identifying a nonvolatile memory as the nonmodifiable memory.

9. An apparatus for executing a program, comprising:
   a nonvolatile memory storing a program contiguously without code fragmentation; wherein an executable code of the program is contiguously stored without being fragmented by non-executable portions of the program in a nonvolatile memory having a bifurcated storage architecture, to permit program execution without address fix-ups;
   a memory management unit that generates an interrupt in response to an executed program instruction to modify a portion of the executable code of the program stored in a page of the nonvolatile memory; and
   a processor for executing the program, wherein execution of the program is halted and the processor copies the portion of the executable code of the program stored in the page of nonvolatile memory to a modifiable memory in response to the interrupt, wherein execution of the program is resumed after modifying the portion of the executable code stored in the modifiable memory and updating address translation tables of the memory management unit to refer to the modifiable memory for subsequent access requests to the modified executable code of the program stored in the modifiable memory.

10. The apparatus of claim 9 wherein the nonvolatile memory is a flash electrically erasable programmable read only memory.

11. The apparatus of claim 9 wherein the nonvolatile memory is a read only memory.

12. The apparatus of claim 9 wherein the modifiable memory is a volatile memory.

13. The apparatus of claim 9 wherein the modifiable memory is a random access memory.

* * * * *

UNITED STATES PATENT AND TRADEMARK OFFICE
CERTIFICATE OF CORRECTION

PATENT NO. : 6,243,789 B1
DATED : June 5, 2001
INVENTOR(S) : Hasbun et al.

It is certified that error appears in the above-identified patent and that said Letters Patent is hereby corrected as shown below:

Column 2,
Line 41, delete "hi".

Column 5,
Line 39, delete "10".

Column 12,
Line 27, delete "claim 1" and insert -- claim 7 --.

Signed and Sealed this

Second Day of December, 2003

JAMES E. ROGAN
*Director of the United States Patent and Trademark Office*